(12) United States Patent
Chavan et al.

(10) Patent No.: US 11,503,665 B2
(45) Date of Patent: Nov. 15, 2022

(54) APPARATUS AND METHODS FOR EFFICIENT LINK DISCONNECTION DETERMINATION

(71) Applicant: Apple Inc., Cupertino, CA (US)

(72) Inventors: Sushant U. Chavan, San Jose, CA (US); Franco Travostino, San Jose, CA (US); Daniel Lertpratchya, Campbell, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 17/007,311

(22) Filed: Aug. 31, 2020

(65) Prior Publication Data

US 2021/0378043 A1    Dec. 2, 2021

Related U.S. Application Data

(60) Provisional application No. 63/033,634, filed on Jun. 2, 2020.

(51) Int. Cl.
| | | |
|---|---|---|
| *H04W 76/25* | (2018.01) | |
| *H04L 29/06* | (2006.01) | |
| *H04W 76/19* | (2018.01) | |
| *H04W 80/06* | (2009.01) | |
| *H04L 9/40* | (2022.01) | |
| *H04W 84/12* | (2009.01) | |

(52) U.S. Cl.
CPC .......... *H04W 76/25* (2018.02); *H04L 63/164* (2013.01); *H04W 76/19* (2018.02); *H04W 80/06* (2013.01); *H04W 84/12* (2013.01)

(58) Field of Classification Search
CPC ..... H04W 76/19; H04W 76/25; H04W 80/06; H04W 84/12; H04L 63/164
See application file for complete search history.

(56) References Cited

U.S. PATENT DOCUMENTS

| | | |
|---|---|---|
| 7,089,012 B2 | 8/2006 | Harris et al. |
| 7,945,661 B2 | 5/2011 | Lehane et al. |
| 7,957,267 B2 | 6/2011 | Sasagawa et al. |
| 8,359,397 B2 | 1/2013 | Traversal et al. |
| 9,026,644 B2 | 5/2015 | Parker et al. |
| 2002/0132603 A1 | 9/2002 | Lindskog et al. |
| 2005/0009530 A1 | 1/2005 | Rouffet et al. |
| 2006/0128308 A1 | 6/2006 | Michael et al. |
| 2007/0189241 A1 | 8/2007 | Zhang |
| 2008/0176548 A1 | 7/2008 | Liang |
| 2012/0230305 A1 | 9/2012 | Barbu et al. |
| 2013/0007484 A1 | 1/2013 | Gobriel et al. |

(Continued)

*Primary Examiner* — Liton Miah
(74) *Attorney, Agent, or Firm* — Fletcher Yoder PC

(57) ABSTRACT

An electronic device connects to another electronic device using a communication link, such as a Wi-Fi link as provided by a Wi-Fi access point. The electronic device includes a transport monitoring module that monitors outgoing communications (e.g., Transmission Control Protocol (TCP) packets) from the electronic device. When the other electronic device disconnects from the Wi-Fi access point, the transport monitoring module determines that a transport anomaly has occurred. In response to determining that the transport anomaly has occurred, a probe module of the electronic device sends a probe (e.g., an Internet Protocol Security (IPSec) dead peer detection probe) to determine whether the other electronic device is reachable.

20 Claims, 7 Drawing Sheets

(56) References Cited

U.S. PATENT DOCUMENTS

| | | | |
|---|---|---|---|
| 2013/0229963 A1 | 9/2013 | Asterjadhi et al. | |
| 2013/0247177 A1 | 9/2013 | Park et al. | |
| 2014/0064209 A1 | 3/2014 | Anchan et al. | |
| 2014/0280705 A1 | 9/2014 | Liik et al. | |
| 2015/0327138 A1* | 11/2015 | Lee | H04W 76/34 |
| | | | 455/426.1 |
| 2015/0350933 A1 | 12/2015 | Mannemala et al. | |
| 2015/0359016 A1 | 12/2015 | Barany et al. | |
| 2015/0373574 A1* | 12/2015 | Gordon | H04L 41/5067 |
| | | | 370/252 |
| 2016/0360489 A1 | 12/2016 | Boodannavar et al. | |
| 2017/0156083 A1* | 6/2017 | Finkenstadt | H04L 67/141 |
| 2017/0332318 A1 | 11/2017 | Vyas et al. | |
| 2021/0176810 A1* | 6/2021 | Chae | H04W 4/80 |
| 2021/0219373 A1* | 7/2021 | Moon | G06F 1/24 |
| 2021/0251033 A1* | 8/2021 | Kanamarlapudi | H04W 76/28 |
| 2021/0314188 A1* | 10/2021 | Mestery | H04L 63/164 |
| 2021/0345140 A1* | 11/2021 | Meingast | G06N 20/00 |

* cited by examiner

APPARATUS AND METHODS FOR EFFICIENT LINK DISCONNECTION DETERMINATION

CROSS-REFERENCE TO RELATED APPLICATION

This application claims the benefit of U.S. Provisional Application No. 63/033,634, filed Jun. 2, 2020, which is hereby incorporated by reference in its entirety for all purposes.

BACKGROUND

The present disclosure relates generally to computer networks, and more particularly to quickly determining when a communication link disconnects.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An electronic device may connect to another electronic device using a communication or physical link, such as a Wi-Fi link as provided by a Wi-Fi access point. Occasionally, the other electronic device may disconnect from the Wi-Fi access point (e.g., due to power drain, user-initiated disconnection, and so on). However, the electronic device may be unaware that the other electronic device has disconnected from the Wi-Fi access point, and continue sending data to the other electronic device without a response. It may take an excessive amount of time for the electronic device to realize that the other electronic device has disconnected from the Wi-Fi access point due to, (e.g., on the scale of several minutes for a Transmission Control Protocol (TCP) timeout), resulting in a negative user experience. Moreover, repeatedly and actively confirming that the other electronic device is connected to the Wi-Fi access point, such as by using keepalive techniques, probing, or peer detection, may not be power-efficient.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An electronic device may connect to another electronic device using a communication link, such as a Wi-Fi link as provided by a Wi-Fi access point. The electronic device may include a transport monitoring module that monitors outgoing communications (e.g., Transmission Control Protocol (TCP) packets) from the electronic device. When the other electronic device disconnects from the Wi-Fi access point, the transport monitoring module may determine that a transport anomaly has occurred. In response to determining that the transport anomaly has occurred, a probe module of the electronic device may send a probe (e.g., an Internet Protocol Security (IPSec) dead peer detection probe) to determine whether the other electronic device is reachable. In this manner, the transport monitoring module may determine that the other electronic device has disconnected from the Wi-Fi access point in much less time (e.g., on the scale of three seconds) than waiting for a TCP timeout to occur. Moreover, because monitoring outgoing communications from the electronic device is much less power intensive than sending keepalive messages or periodic probes, power may be saved.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "in some embodiments" of the present disclosure are not intended to be interpreted as excluding the existence of additional embodiments that also incorporate the recited features.

The disclosed embodiments may apply to a variety of electronic devices. In particular, any electronic device that transmits or receives signals over a communication network may incorporate the disclosed transport monitoring module or techniques to efficiently determine when a second electronic device connected to a first electronic device via a communication link has disconnected. With the foregoing in mind, a general description of suitable electronic devices that may include the disclosed transport monitoring module or techniques is provided below.

Figure 1:
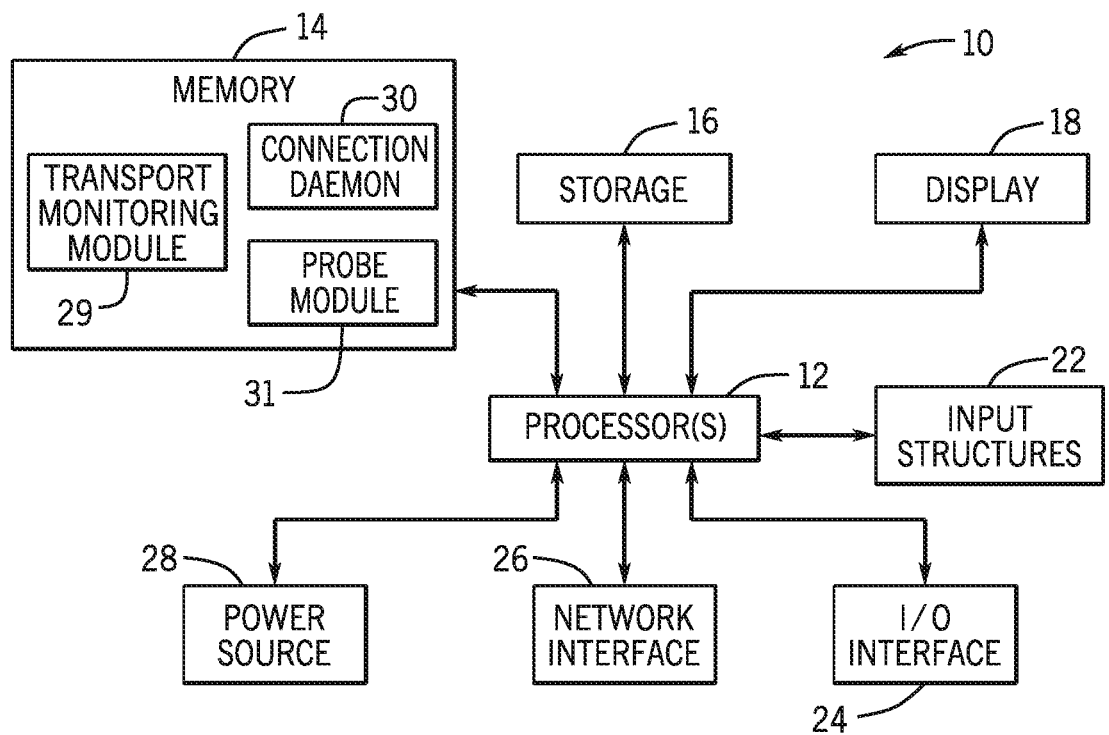
FIG. 1 is a schematic block diagram of an electronic device including a transceiver, in accordance with an embodiment.

Turning first to FIG. 1, an electronic device 10 according to an embodiment of the present disclosure may include, among other things, one or more of processors 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by the processor 12 and may cause the processor 12 to perform operations as described herein. It should be noted that FIG. 1 is merely one example of a particular embodiment and is intended to illustrate the types of elements that may be present in the electronic device 10. Additionally, reference to the processor 12 in the present disclosure should be understood to include any processor or combination of processors of the one or more of processors 12.

Figure 2:
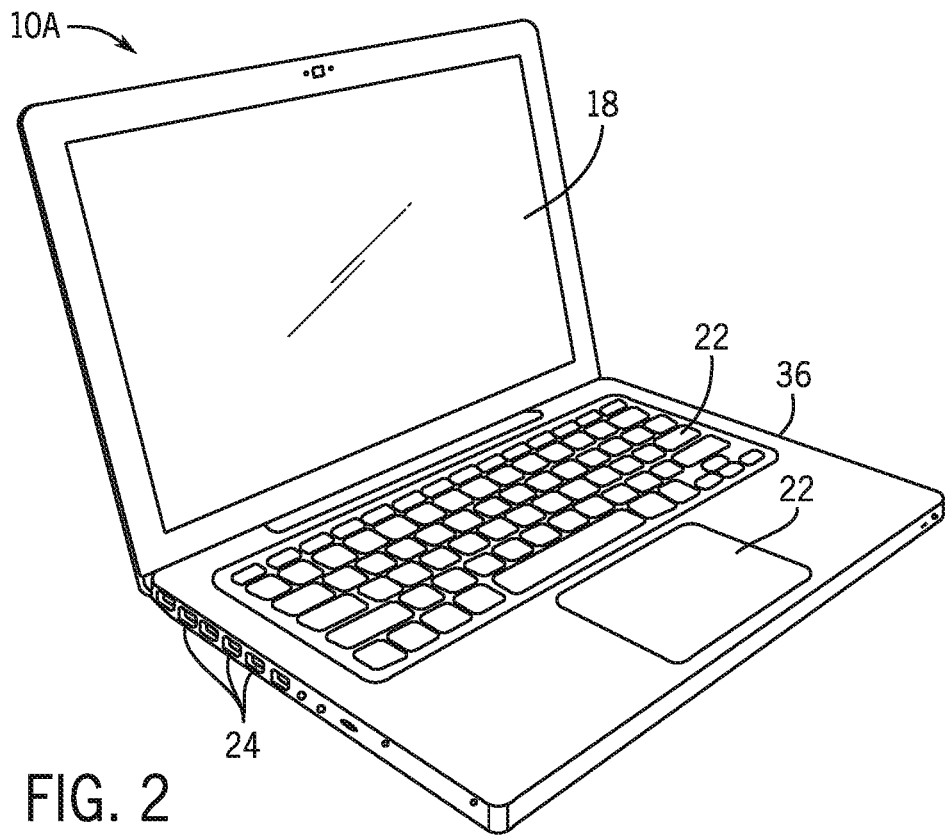
FIG. 2 is a perspective view of a notebook computer representing a first embodiment of the electronic device of FIG. 1.
Figure 4:
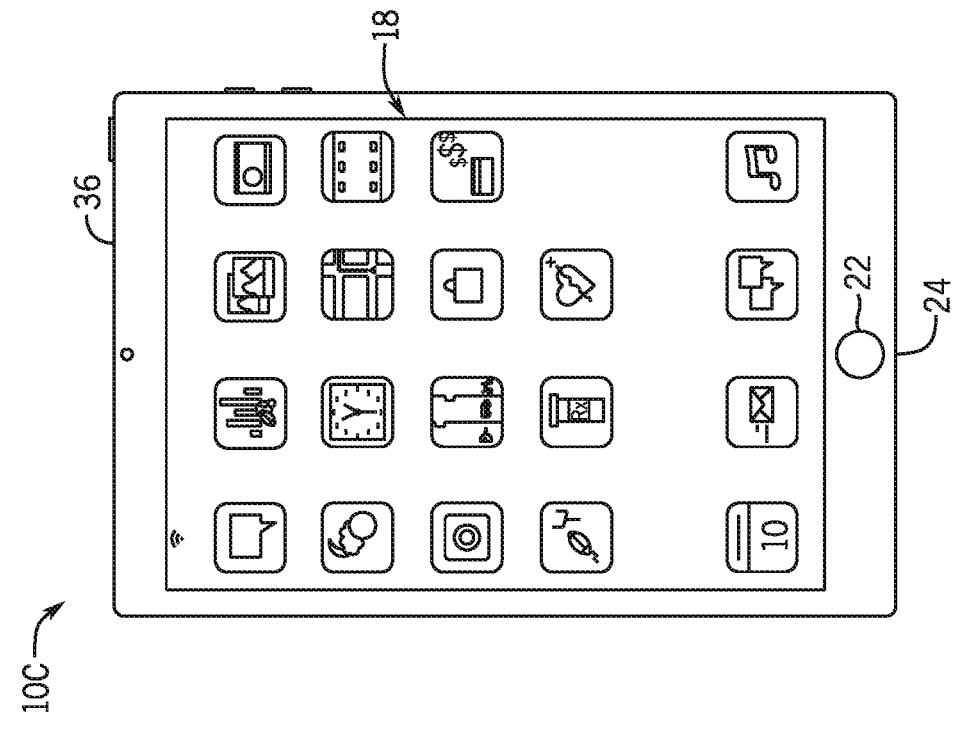
FIG. 4 is a front view of another handheld device representing a third embodiment of the electronic device of FIG. 1.
Figure 3:
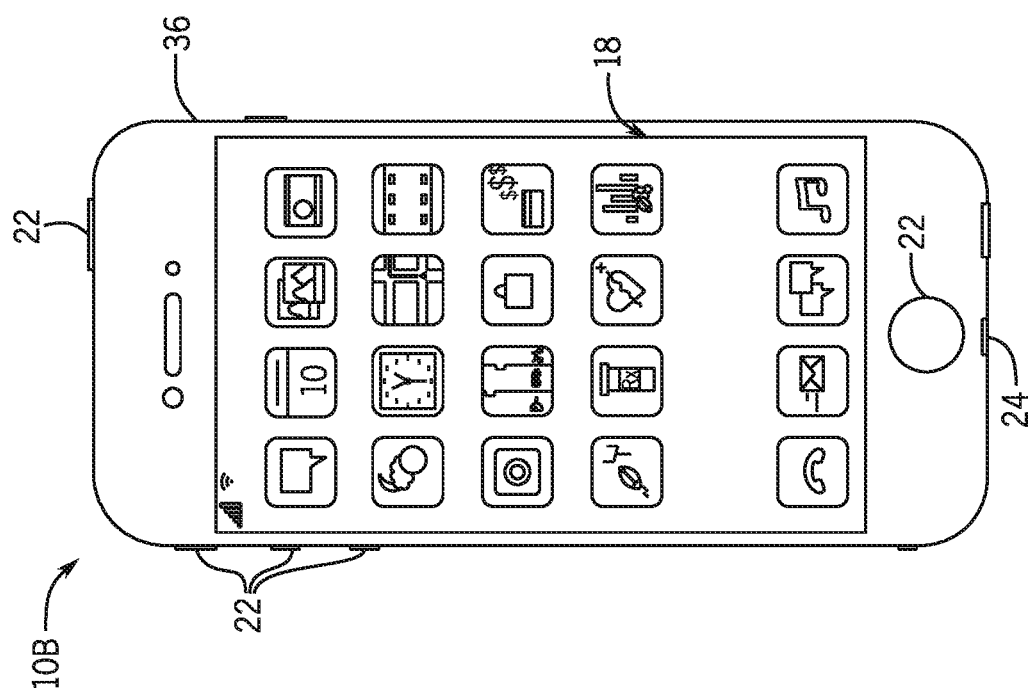
FIG. 3 is a front view of a handheld device representing a second embodiment of the electronic device of FIG. 1.
Figure 5:
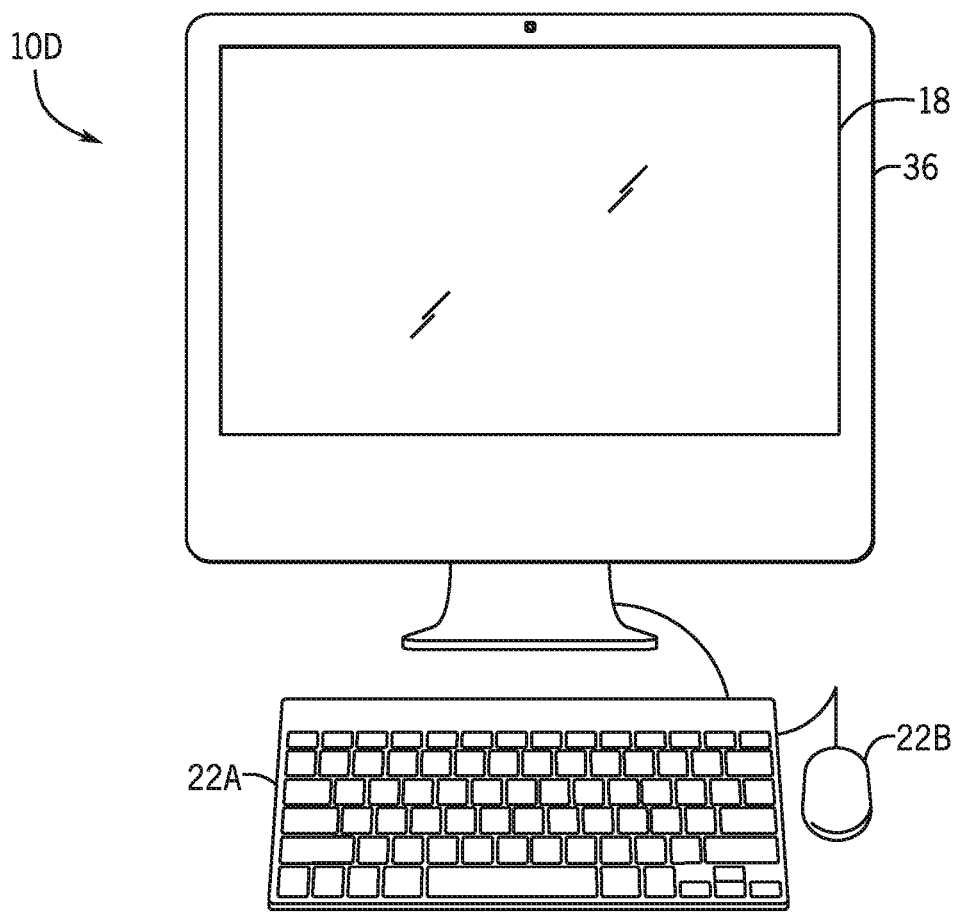
FIG. 5 is a front view of a desktop computer representing a fourth embodiment of the electronic device of FIG. 1.
Figure 6:
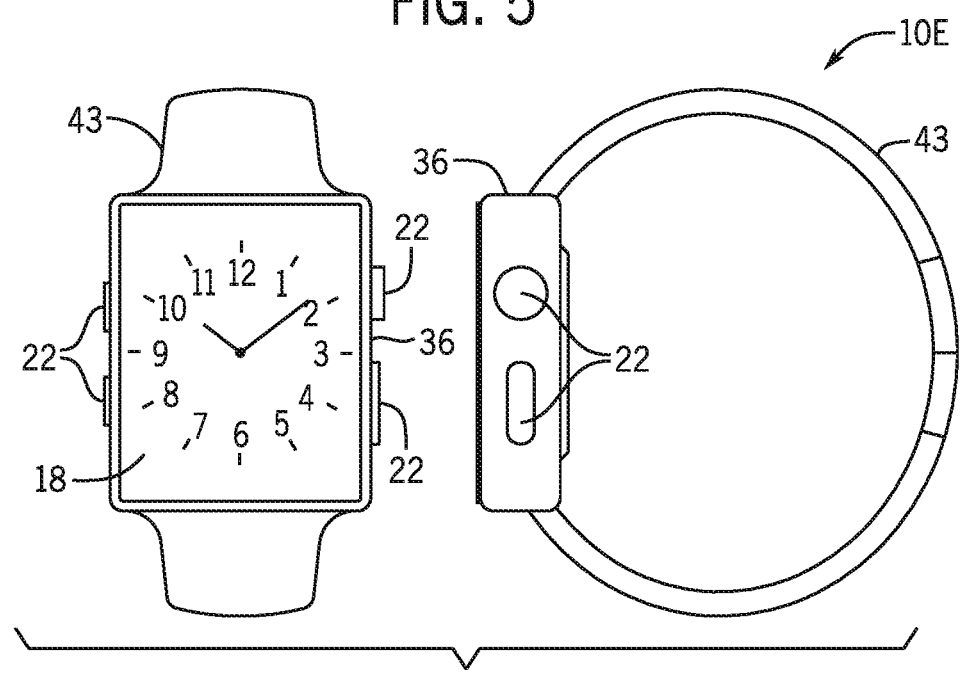
FIG. 6 is a front view and side view of a wearable electronic device representing a fifth embodiment of the electronic device of FIG. 1.

By way of example, a block diagram of the electronic device 10 may represent the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor 12 may operably couple with the memory 14 and the nonvolatile storage 16 to perform various algorithms. Such programs or instructions executed by the processor 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor 12 to enable the electronic device 10 to provide various functionalities.

As illustrated, the memory 14 may store a transport monitoring module 29 as instructions executable by the processor 12. The transport monitoring module 29 may monitor outgoing communications (e.g., Transmission Control Protocol (TCP) packets) from the electronic device 10, and determine whether a transport anomaly has occurred. The memory 14 may additionally or alternatively store a connection daemon 30 that enables connecting the electronic device 10 to other electronic devices, sets up secure links between the electronic device 10 to and the other electronic devices, manages connectivity between the electronic device 10 to and the other electronic devices, and so on. The connection daemon 30 may run on an operating system of the electronic device 10. The memory 14 may additionally store a probe module 31 that may send a probe (e.g., an Internet Protocol Security (IPSec) dead peer detection probe) to determine whether another electronic device is reachable. While the transport monitoring module 29, the connection daemon 30, and the probe module 31 are illustrated as being stored in the memory 14, it should be understood that these elements may be stored in any suitable medium or component, such as the storage 16 and/or the network interface 26. Moreover, while the transport monitoring module 29 and the probe module are described as software, it should be understood that the transport monitoring module 29 and/or the probe module 31 may be implemented, in whole or in part, as firmware (e.g., stored on the memory 14 or storage 16) and/or hardware (e.g., as part of the processor 12 and/or the network interface 26) of the electronic device 10.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26.

The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, $4^{th}$ generation (4G) cellular network, long term evolution (LTE®) cellular network, long term evolution license assisted access (LTE-LAA) cellular network, $5^{th}$ generation (5G) cellular network, or New Radio (NR) cellular network. The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The network interface 26 may be implemented as software (e.g., as a logical construct) and/or hardware (e.g., as a network interface controller, card, or adapter).

As further illustrated, the electronic device 10 may include the power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers) and/or those that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif. By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a standard connector and protocol, such as the Lightning connector provided by Apple Inc. of Cupertino, Calif., a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, Calif. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an Apple Watch® by Apple Inc. of Cupertino, Calif. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E.

In certain embodiments, as previously noted above, each embodiment (e.g., notebook computer 10A, handheld device 10B, handheld device 10C, computer 10D, and wearable electronic device 10E) of the electronic device 10 may include the disclosed transport monitoring module 29 or techniques to efficiently determine when another electronic device connected to the electronic device 10 via a communication link has disconnected.

Figure 7:
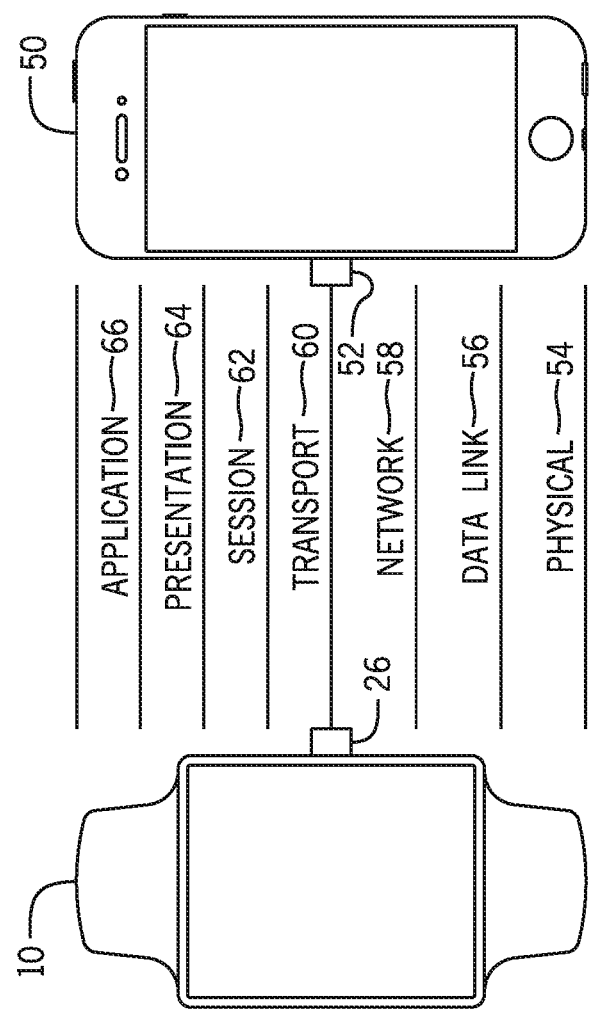
FIG. 7 is a diagram showing the electronic device of FIG. 1 communicating with another electronic device and corresponding Open Systems Interconnection model layers, according to embodiments of the present disclosure.

With the foregoing in mind, FIG. 7 is a diagram showing the electronic device 10 communicating with another electronic device 50 and corresponding Open Systems Interconnection (OSI) model layers, according to embodiments of the present disclosure. As illustrated, the electronic device 10 may communicate with the other electronic device 50 via respective network interfaces 26, 52. The OSI model layers include a physical layer 54, a data link layer 56, a network layer 58, a transport layer 60, a session layer 62, a presentation layer 64, and an application layer 66. In particular, because the disclosed transport monitoring module 29 and techniques monitor outgoing communications, such as TCP packets, the disclosed transport monitoring module 29 and techniques relate to the transport layer 60. Additionally, the communication link (e.g. a Wi-Fi, a cellular link, a Bluetooth link) that the other electronic device 50 may disconnect from may relate to the physical and/or data link layers 54, 56.

Figure 8:
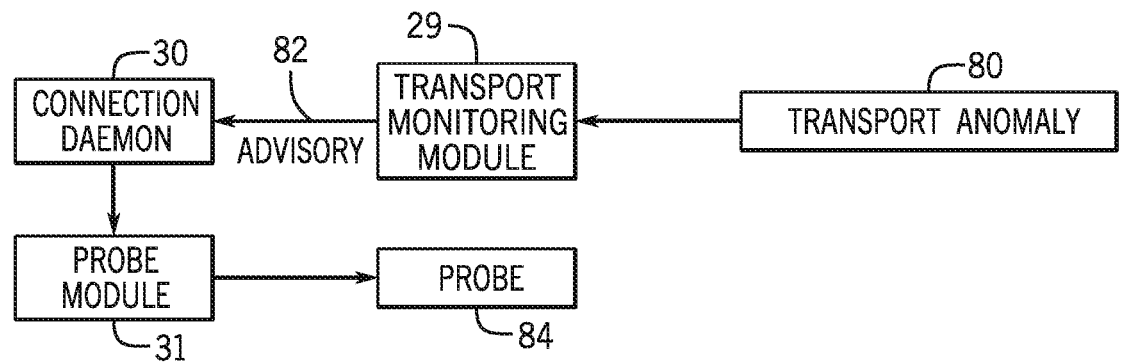
FIG. 8 is a block diagram illustrating a transport monitoring module of the electronic device of FIG. 1 in operation, according to embodiments of the present disclosure.

FIG. 8 is a block diagram illustrating the transport monitoring module 29 in operation, according to embodiments of the present disclosure. As noted above, the transport monitoring module 29 may monitor outgoing communications (e.g., Transmission Control Protocol (TCP) packets) from the electronic device 10, and determine whether a transport anomaly 80 has occurred. The transport anomaly 80 may indicate that the other electronic device 50 has disconnected from the communication link.

For example, the transport anomaly 80 may include an indication of dropped TCP packets or a round trip time (RTT) of packets increasing. That is, in some embodiments, the transport monitoring module 29 may compare a number of dropped packets to a threshold number of dropped packets (e.g., for a certain number of sent packets, for a certain time period, and so on). If the number of dropped packets exceeds the threshold number, then the transport monitoring module 29 may determine that the transport anomaly 80 has occurred. For example, if the threshold number of dropped packets may be five packets for every ten packets. As such, if the transport monitoring module 29 monitors six packets dropped for ten packets being sent by the electronic device 10, then the transport monitoring module 29 determines the transport anomaly 80 has occurred. It should be understood that the threshold number of dropped packets may be any suitable number of dropped packets (e.g., one to ten packets for every ten packets, one to five packets for every ten packets, two to four packets for every ten packets) that indicates that the transport anomaly 80 has occurred.

In some embodiments, the transport monitoring module 29 may monitor connection/write flags for a TCP connection over the communication link 206, which may be indicative of the transport anomaly 80. For example, the electronic device 10 may determine a connection/write ratio with the connection numerator set to a number of TCP connections of flows with either a C or W bit (or flag) asserted within a particular period of time (e.g., the last 30 seconds), and the write denominator being a total number of TCP connections or flows that were attempted (e.g., including successful and unsuccessful TCP connections) over the particular period of time. That is, the connection/write ratio may correlate to a ratio of stuck or stalled connections over all attempted connections. The closer the ratio is to 1.0, the higher the sense of trouble with connecting. The C bit may be set on a TCP flow (or TCP connection) when the flow has sent N SYN packets without receiving a response, and the W bit may be set on a TCP flow (or TCP connection) when the flow has retransmitted the same packet N times without receiving an ACK packet, where N is a tunable factor and may be initially set to, for example, 5. SYN refers to a synchronize packet (e.g., a packet that requests that a connection be established with the other electronic device 50), while ACK refers to an acknowledgement packet (e.g., in response to receiving the SYN packet). In some embodiments, the numerator may only include the number of TCP connections that had the C or W bit set over the particular period of time. In any case, the transport monitoring module 29 may determine that the transport anomaly 80 has occurred when the connection/write ratio exceeds a threshold connection/write ratio (e.g., between 0 and 1, such as 1/10, 2/5, 3/10, 1/2, or any other suitable threshold connection/write ratio indicative of that the transport anomaly 80 has occurred).

In additional or alternative embodiments, the transport anomaly 80 may include the round trip time of packets increasing over time. That is, the round trip time of packets may include the length time it takes for a data packet to be sent from the electronic device 10 to the other electronic device 50, plus the time it takes for an acknowledgment of that packet to be received back at the electronic device 10. The round trip time may be determined using a ping command. Specifically, the transport monitoring module 29 may determine that the transport anomaly 80 has occurred if the round trip time of packets between the electronic device 10 and the other electronic device 50 increases over time, increases by a threshold percentage or by threshold time period, and/or increases over a threshold time period.

In some embodiments, the transport monitoring module 29 may monitor connectivity of the connection daemon 30 running on the operating system of the electronic device 10. The connection daemon 30 may, for example, maintain a long-lived connection to the other electronic device 50, and the connection daemon 30 may provide a notification when it is unable to contact the other electronic device 50. The transport monitoring module 29 may determine that the transport anomaly 80 has occurred if it receives the notification from the connection daemon 30.

In response to determining the transport anomaly 80 has occurred, the transport monitoring module 29 may send a notification or advisory 82 to the connection daemon 30. As mentioned above, the connection daemon 30 may enable the electronic device 10 to connect to the other electronic device 50, set up secure links between the electronic device 10 to and the other electronic device 50, manages connectivity between the electronic device 10 to and the other electronic device 50, and so on. In response to receiving the advisory 82, the connection daemon 30 may instruct the probe module 31 to send a probe 84 to determine whether the other electronic device 50 is reachable. In some embodiments, the probe 84 may include an Internet Protocol Security (IPSec) dead peer detection (DPD) probe. The dead peer detection probe may include a message that verifies the current existence and availability of IPsec peer devices, such as the other electronic device 50. The message may include encrypted Internet Key Exchange (IKE) Phase 1 notification payloads (R-U-THERE messages) to the other electronic device 50 and waiting for dead peer detection acknowledgements (R-U-THERE-ACK messages) from the other electronic device 50. The probe 84 may be sent to and/or include a destination address (e.g., an IP address) of the other electronic device 50.

In some embodiments, the probe 84 may include a User Datagram Protocol (UDP) packet, sent by the electronic device 10 and, if the other electronic device 50 is connected via an access point (e.g., a Wi-Fi access point), returned by the other electronic device 50. In additional or alternative embodiments, the electronic device 10 may re-send the probe 84 a threshold number of times (e.g., three times) before concluding that the other electronic device 10 has disconnected from the access point. In some instances, to ensure that it is not the access point that is the cause of the other electronic device 50 being unreachable, the electronic device 10 may determine whether the access point is reachable, such as by verifying a communication link health associated with the access point and/or sending an additional probe (e.g., a ping probe) to the access point and be returned by the access point.

In the case of determining the transport anomaly 80 based on the number of dropped TCP packets or increasing round trip time (RTT) of packets, the transport monitoring module 29 may determine that the other electronic device 50 has disconnected from the communication link in much less time (e.g., on the scale of three seconds) than waiting for a TCP timeout to occur (which may take up to several minutes). Moreover, because monitoring outgoing communications from the electronic device 10 is much less power intensive than actively querying the other electronic device 50 (e.g., via sending keepalive messages (messages sent by the electronic device 10 to check that the communication link to the other electronic device 50 is operating) or periodic probes), power may be saved using the disclosed transport monitoring module 29 and techniques. That said, in some embodiments, a keepalive message and/or a probe may still be sent when there is an indication that the other electronic device 50 has disconnected (e.g., as indicated by determining the transport anomaly 80).

Figure 9:
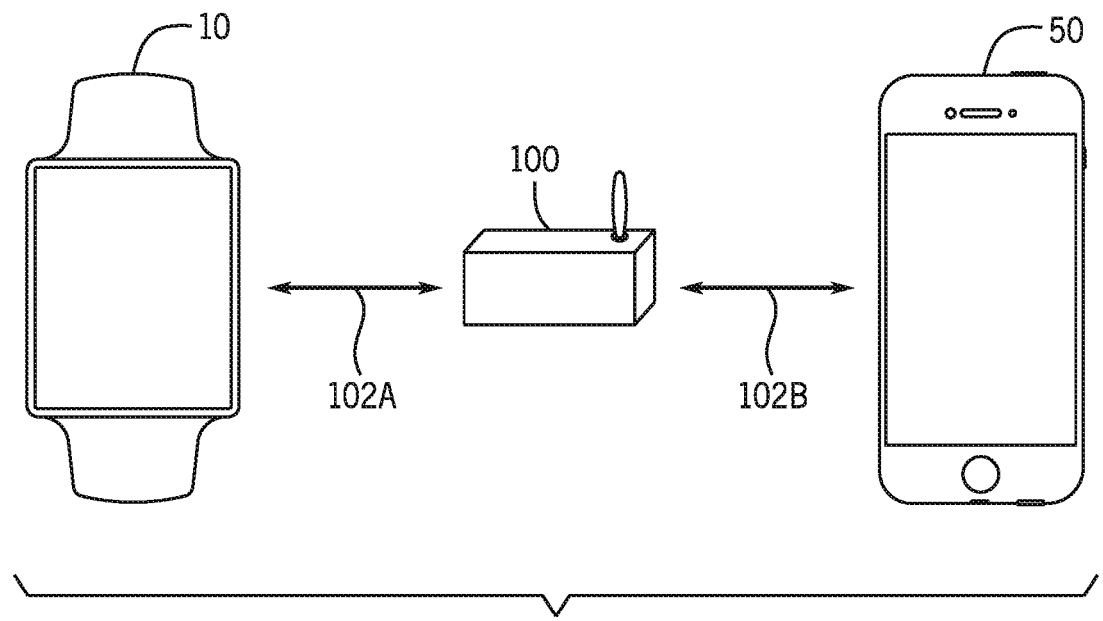
FIG. 9 is diagram of the electronic device of FIG. 1 connected to the other electronic device of FIG. 7 via a Wi-Fi access point, according to embodiments of the present disclosure.

FIG. 9 is diagram of the electronic device 10 connected to the other electronic device 50 via an access point 100 (e.g., a Wi-Fi access point), according to embodiments of the present disclosure. In particular, the Wi-Fi access point 100 may provide a Wi-Fi link 102A between the electronic device 10 and the Wi-Fi access point 100, and a Wi-Fi link 102B between the other electronic device 50 and the Wi-Fi access point 100 (collectively, a Wi-Fi link 102 between the electronic device 10 and the other electronic device 50). While the Wi-Fi access point 100 provides the Wi-Fi link 102, the transport monitoring module 29 may monitor outgoing communications, such as outgoing TCP packets, from the electronic device 10 transmitted using a TCP connection provided over the Wi-Fi link 102. While the remainder of the disclosure discusses the electronic device 10 and the other electronic device 50 connected via the Wi-Fi access point 100, other communication technologies are contemplated, such as cellular base stations, Bluetooth access points (e.g., beacons), virtual private network (VPN) servers, and so on.

Figure 10:
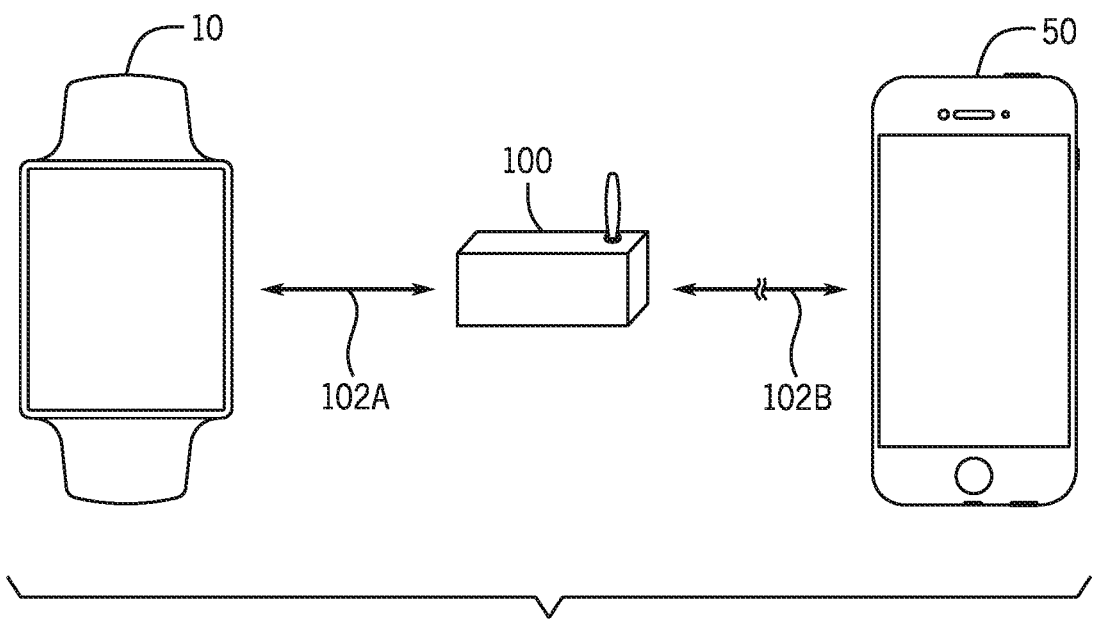
FIG. 10 is diagram of the other electronic device disconnected from Wi-Fi access point of FIG. 9, according to embodiments of the present disclosure.

FIG. 10 is diagram of the other electronic device 50 disconnected from Wi-Fi access point 100, according to embodiments of the present disclosure. In particular, the Wi-Fi link 102B between the other electronic device 50 and the Wi-Fi access point 100 has been disconnected. This could be because power drain of the other electronic device 50, a user of the other electronic device 50 choosing to disconnect from the Wi-Fi access point 100, congestion at the Wi-Fi access point 100, and so on. Initially, the electronic device 10 may not receive an indication that the other electronic device 50 has disconnected from Wi-Fi access point 100. Given enough time (e.g., approximately 75 seconds), the TCP connection would eventually timeout. However, waiting that period of time while data is not received from the other electronic device 50 may negatively impact user experience on the electronic device 10. Moreover, repeatedly and actively confirming that the other electronic device 50 is connected to the Wi-Fi access point 100, such as by using keepalive techniques, periodic probing, or periodic peer detection, may be an inefficient use of power.

Instead, the transport monitoring module 29 may determine that a transport anomaly 100 has occurred, based on dropped TCP packets, connection/write flags of the TCP connection, connectivity of the connection daemon 30, increasing round trip time of packets, or the like. In response to determining that the transport anomaly 100 has occurred, the connection daemon 30 may instruct the probe module 31 to send the probe 84 (e.g., an IPSec dead peer detection probe), a keepalive message, or any other suitable technique that elicits a relative quick or immediate response from the other electronic device 50 to determine whether the other electronic device 50 is reachable.

If a probe response is received from the other electronic device 50, then the connection daemon 30 determines that the other electronic device 50 exists and remains connected to the Wi-Fi access point 100. As such, the electronic device 10 may continue communicating with the other electronic device 50 using the Wi-Fi link 102.

Figure 11:
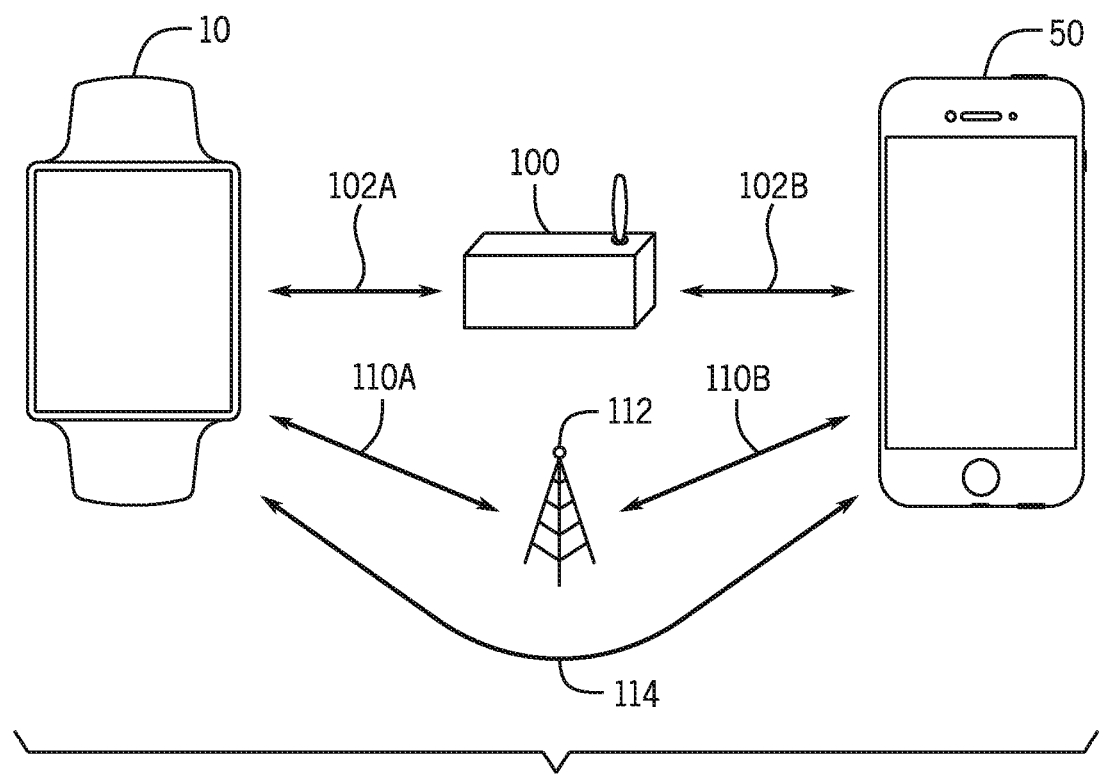
FIG. 11 is diagram of the electronic device reconnecting to the other electronic device of FIG. 10, according to embodiments of the present disclosure.

If a probe response is not received from the other electronic device 50, then the connection daemon 30 determines that the other electronic device 50 no longer exists and has disconnected from the Wi-Fi access point 100. The connection daemon 30 may attempt to reconnect to the other electronic device 50 over the Wi-Fi link 102, or connect to the other electronic device 50 over a new physical link. FIG. 11 is diagram of the electronic device 10 reconnecting to the other electronic device 50, according to embodiments of the present disclosure. In particular, the electronic device 10 may reconnecting to the other electronic device 50 over the Wi-Fi link 102. If reconnection fails or is not possible, the electronic device 10 may reconnect to the other electronic device 50 over a cellular link 110 provided by a cellular base station 112, provided via a cellular link 110A between the electronic device 10 and the base station 112 and a cellular link 110B between the other electronic device 10 and the base station 112. The cellular base station 112 and/or the cellular link 110 may be part of any suitable cellular communication network such as a wide area network (WAN), a $3^{rd}$ generation (3G) cellular network, $4^{th}$ generation (4G) cellular network, long term evolution (LTE®) cellular network, long term evolution license assisted access (LTE-LAA) cellular network, $5^{th}$ generation (5G) cellular network, or New Radio (NR) cellular network. Additionally or alternatively, the electronic device 10 may reconnect to the other electronic device 50 directly (e.g., without an intermediate device such as the Wi-Fi access point 100 or the base station 112), such as over a Bluetooth link 114 or any other suitable personal area network (PAN) link.

It should be understood that the Wi-Fi link 102, the cellular link 110, and the Bluetooth link 114 are provided as examples, and any suitable communication link is contemplated. For example, in one embodiment, the link between the electronic device 10 and the other electronic device 50 may be provided by a first VPN server, and if the connection daemon 30 determines that the other electronic device 50 has disconnected from the first VPN server, it may attempt to connect to the other electronic device 50 using a second VPN server.

Figure 12:
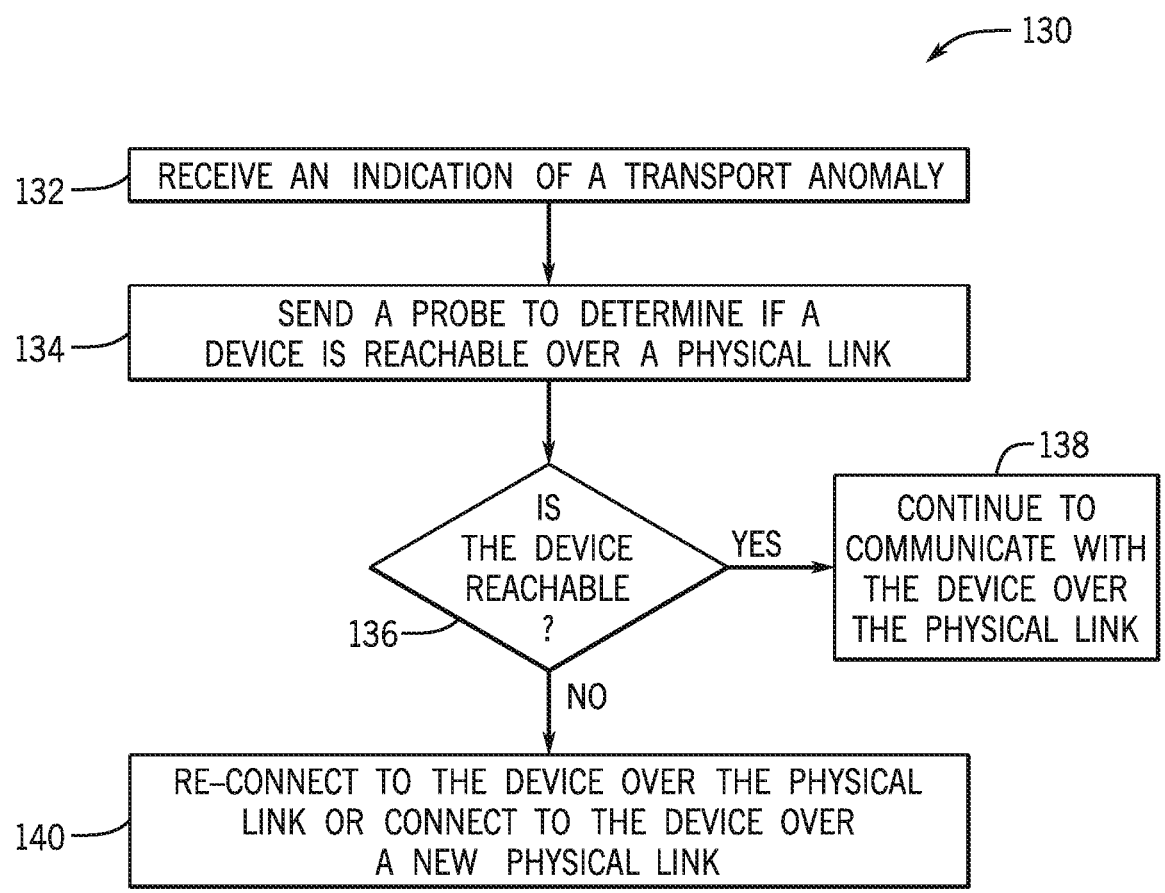
FIG. 12 is a flowchart of a method for efficiently determining when the other electronic device of FIG. 7 connected to the electronic device of FIG. 1 via a communication link has disconnected, according to embodiments of the present disclosure.

FIG. 12 is a flowchart of a method 130 for efficiently determining when another electronic device (e.g., 50) connected to the electronic device 10 via a communication link (e.g., as provided by the Wi-Fi access point 100) has disconnected, according to embodiments of the present disclosure. Any suitable device (e.g., a controller) that may control components of the electronic device 10, such as the processor 12, may perform the method 130. In some embodiments, the method 130 may be implemented by executing instructions stored in a tangible, non-transitory, computer-readable medium, such as the memory 14 or storage 16, using the processor 12. For example, the method 130 may be performed at least in part by one or more software components, such as an operating system of the electronic device 10, the transport monitoring module 29 (as described below), the connection daemon 30, the probe module 31, and the like. While the method 130 is described using steps in a specific sequence, it should be understood that the present disclosure contemplates that the described steps may be performed in different sequences than the sequence illustrated, and certain described steps may be skipped or not performed altogether.

In process block 132, the transport monitoring module 29 receives an indication of a transport anomaly (e.g., 80). The transport anomaly 80 may include dropped (TCP) packets exceeding a threshold number of dropped packets, connection/write flags of the TCP connection exceeding a threshold connection/write ratio, an indication from the connection daemon 30 that it is unable to contact the other electronic device 50, increasing round trip time of packets, and so on.

In response to the transport monitoring module 29 receiving the indication of the transport anomaly 80, in process block 134, the connection daemon 30 may instruct the probe module 31 to send a probe 84 to determine if the other electronic device 50 is reachable over the communication link (e.g., 102). In particular, the transport monitoring module 29 may send a notification or advisory 32 to the connection daemon 30 to indicate that there the transport anomaly 80 exists. In some embodiments, the probe 84 includes an IPSec dead peer detection probe. In additional or alternative embodiments, a keepalive message or any other suitable technique that elicits a relative quick or immediate response from the other electronic device 50 to determine whether the other electronic device 50 is reachable may be used in place of or in addition to the probe 84. The probe 84 may be sent to and/or include a destination address (e.g., an IP address) of the other electronic device 50. Moreover, the connection daemon 30 may instruct the probe module 31 to send the probe 84 prior to a connection timeout (e.g., a TCP timeout) occurs. Because the connection timeout may be determined after an excessively long duration of time (e.g., on the scale of minutes), determining that the other electronic device 50 has disconnected via the probe 84 may take significantly less time than waiting for the connection timeout.

In some instances, to ensure that it is not the Wi-Fi access point 100 that is the cause of the other electronic device 50 being unreachable, the electronic device 10 may determine whether the Wi-Fi access point 100 is reachable, such as by verifying a communication link health (e.g., a Wi-Fi link health) associated with the Wi-Fi access point 100 and/or sending an additional probe (e.g., a ping probe) to the Wi-Fi access point 100 and be returned by the Wi-Fi access point 100. In cases where the additional probe is sent, if a response is returned by the Wi-Fi access point 100, then the electronic device 10 may determine that the Wi-Fi access point 100 is in good health and/or reachable. If a response is not returned, then may determine that the Wi-Fi access point 100 is in poor health and/or unreachable.

In decision block 136, the connection daemon 30 determines whether the other electronic device 50 is reachable. In particular, if a probe response is received from the other electronic device 50, then the other electronic device 50 is reachable and remains connected to the communication link 102. As such, in process block 138, the electronic device 10 continues to communicate with the other electronic device 50 over the physical link 102. If a probe response is not received from the other electronic device 50, then the other electronic device 50 is not reachable and may be disconnected from the communication link 102. As such, in process block 140, the electronic device 10 may attempt to reconnect to the other electronic device 50 over the physical link 102. Additionally or alternatively, the electronic device 10 may attempt to connect to the other electronic device 50 over a new physical link. For example, if the original physical link 102 was a Wi-Fi link, the electronic device 10 may attempt to connect to the other electronic device 50 over a cellular link (e.g., 110) or a Bluetooth link (e.g., 114). In this manner, the method 130 may efficiently determine when the other electronic device 50 connected to the electronic device 10 via the communication link 102 has disconnected.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. One or more tangible, non-transitory, computer-readable media, comprising instructions that, when executed, cause one or more processors to:
   receive a first indication of a transport anomaly at a first electronic device;
   prior to receiving a second indication of a connection timeout, send, from the first electronic device, a probe to determine if a second electronic device is reachable over a communication link;
   determine that the second electronic device is not reachable over the communication link; and
   in response to determining that the second electronic device is not reachable over the communication link, reconnect to the second electronic device over the communication link or connect to the second electronic device over a new communication link.

2. The one or more tangible, non-transitory, computer-readable media of claim 1, wherein the instructions cause the one or more processors to send an advisory to a connection daemon of the first electronic device that the transport anomaly exists.

3. The one or more tangible, non-transitory, computer-readable media of claim 1, wherein the transport anomaly comprises a number of dropped packets.

4. The one or more tangible, non-transitory, computer-readable media of claim 1, wherein the transport anomaly comprises a number of dropped packets being greater than a threshold number of dropped packets.

5. The one or more tangible, non-transitory, computer-readable media of claim 1, wherein the transport anomaly comprises an increasing round trip time of packets.

6. The one or more tangible, non-transitory, computer-readable media of claim 1, wherein the communication link comprises a Wi-Fi link.

7. The one or more tangible, non-transitory, computer-readable media of claim 1, wherein the new communication link comprises a cellular link.

8. The one or more tangible, non-transitory, computer-readable media of claim 1, wherein the new communication link comprises a Bluetooth link.

9. The one or more tangible, non-transitory, computer-readable media of claim 1, wherein the connection timeout comprises a Transmission Control Protocol (TCP) timeout.

10. An electronic device comprising:
a network interface configured to communicatively couple to an additional electronic device via an access point; and
one or more processors configured to:
receive an indication of a transport anomaly associated with the additional electronic device;
in response to receiving the indication of the transport anomaly, send a probe using the network interface to determine whether the additional electronic device is reachable using the access point; and
in response to determining that the additional electronic device is reachable using the access point, reconnect to the additional electronic device using the access point.

11. The electronic device of claim 10, wherein the access point comprises a Wi-Fi access point.

12. The electronic device of claim 10, wherein the probe comprises an Internet Protocol Security (IPSec) dead peer detection (DPD) probe.

13. The electronic device of claim 10, wherein the probe comprises a User Datagram Protocol (UDP) packet.

14. The electronic device of claim 13, wherein the one or more processors are configured to determine that the additional electronic device is reachable based on receiving the UDP packet from the additional electronic device.

15. The electronic device of claim 10, wherein the one or more processors are configured to send an additional probe to the access point to determine whether the access point is reachable.

16. A computer-implemented method comprising:
receiving, via a computer, a first indication of a transport anomaly associated with an electronic device;
in response to receiving the first indication of the transport anomaly and prior to receiving a second indication of a connection timeout, sending, via the computer, a probe to the electronic device to determine if the electronic device is reachable over a communication link;
determining, via the computer, that the electronic device is not reachable over the communication link based on the probe; and
in response to determining that the electronic device is not reachable over the communication link, reconnecting, via the computer, to the electronic device over the communication link or connecting, via the computer, to the electronic device over a new communication link.

17. The computer-implemented method of claim 16, wherein the communication link is provided by a Wi-Fi access point.

18. The computer-implemented method of claim 17, wherein reconnecting to the electronic device over the communication link comprises reconnecting, via the computer, to the Wi-Fi access point.

19. The computer-implemented method of claim 16, wherein connecting to the electronic device over the new communication link comprises connecting, via the computer, to a cellular base station.

20. The computer-implemented method of claim 16, wherein connecting to the electronic device over the new communication link comprises connecting, via the computer, directly to the electronic device.

* * * * *